(12) United States Patent
Wagle et al.

(10) Patent No.: US 9,133,385 B2
(45) Date of Patent: Sep. 15, 2015

(54) METHOD FOR IMPROVING HIGH TEMPERATURE RHEOLOGY IN DRILLING FLUIDS

(71) Applicant: Halliburton Energy Services, Inc., Houston, TX (US)

(72) Inventors: Vikrant Bhavanishankar Wagle, Mumbai (IN); Sharath Savari, Kingwood, TX (US); Sandeep D. Kulkarni, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 286 days.

(21) Appl. No.: 13/631,992

(22) Filed: Sep. 30, 2012

(65) Prior Publication Data

US 2014/0090896 A1   Apr. 3, 2014

(51) Int. Cl.
*E21B 33/13* (2006.01)
*E21B 7/00* (2006.01)
*C09K 8/34* (2006.01)
*C09K 8/36* (2006.01)
*C08L 83/04* (2006.01)

(52) U.S. Cl.
CPC . *C09K 8/34* (2013.01); *C08L 83/04* (2013.01); *C09K 8/36* (2013.01); *E21B 7/00* (2013.01); *E21B 33/13* (2013.01)

(58) Field of Classification Search
CPC ............. E21B 7/00; E21B 22/43; C09K 8/36; C09K 8/34; C08L 83/04
USPC .......................... 166/283, 282, 358; 175/285
See application file for complete search history.

(56) References Cited

U.S. PATENT DOCUMENTS

| 5,707,939 | A | * | 1/1998 | Patel ............................. 507/127 |
| 5,909,779 | A | * | 6/1999 | Patel et al. ...................... 175/50 |
| 6,405,809 | B2 | * | 6/2002 | Patel et al. ...................... 175/50 |
| 6,649,571 | B1 | * | 11/2003 | Morgan ......................... 507/102 |
| 6,703,351 | B2 | * | 3/2004 | Stowe et al. ................... 507/117 |
| 7,462,580 | B2 | | 12/2008 | Kirsner et al. |
| 7,488,704 | B2 | | 2/2009 | Kirsner et al. |
| 7,897,547 | B1 | | 3/2011 | Lin et al. |
| 2003/0064897 | A1 | * | 4/2003 | Kirsner et al. ................. 507/100 |

FOREIGN PATENT DOCUMENTS

| WO | 98/05734 | A1 | 2/1998 |
| WO | 01/74478 | A2 | 10/2001 |

OTHER PUBLICATIONS

Darley, H.C.H., et al., Composition and Properties of Drilling and Completion Fluids, pp. 66-67, and 561-562 (5th edition, 1988.).
International Search Report and Written Opinion issued in related PCT Application No. PCT/US2013/061779 mailed Jan. 3, 2014, 13 pages.

* cited by examiner

*Primary Examiner* — Zakiya W Bates
*Assistant Examiner* — Silvana Runyan
(74) *Attorney, Agent, or Firm* — Holly Soehnge; Baker Botts L.L.P.

(57) ABSTRACT

A method for enhancing the rheology of drilling fluids that is effective for any mud weight "clay-free" invert emulsion drilling fluid, even when drilling at high temperatures. The improved rheology is effected with addition of a silicon oil to the drilling fluid. A nonlimiting example of such a rheology additive comprises polydimethylsiloxane.

18 Claims, 1 Drawing Sheet

METHOD FOR IMPROVING HIGH TEMPERATURE RHEOLOGY IN DRILLING FLUIDS

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to oil or synthetic fluid based invert emulsion drilling fluids which combine high ecological compatibility with good stability and performance properties. Most particularly, the invention relates to clay-free invert emulsion drilling fluids.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation. For the drilling fluid to perform its functions, its optimum chemical and rheological properties must be controlled.

Oil or synthetic fluid-based muds are normally used to drill swelling or sloughing shales, salt, gypsum, anhydrite or other evaporate formations, hydrogen sulfide-containing formations, and hot (greater than about 300 degrees Fahrenheit ("° F.")) holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such oils shall be understood to comprise invert emulsions.

Oil-based muds used in drilling typically comprise: a base oil (or synthetic fluid) comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Such additives commonly include organophilic clays and organophilic lignites. See H. C. H. Darley and George R. Gray, Composition and Properties of Drilling and Completion Fluids 66-67, 561-562 (5$^{th}$ ed. 1988). An oil-based or invert emulsion-based drilling fluid may commonly comprise between about 50:50 to about 95:5 by volume oil or oleaginous phase to water or aqueous phase.

Recent technology as described for example in U.S. Pat. Nos. 7,462,580 and 7,488,704 to Kirsner, et al., introduced "clay-free" invert emulsion-based drilling fluids, which offer significant advantages over drilling fluids containing organophilic clays. As used herein, the term "clay-free" (or "clayless") means a drilling fluid made without addition of any organophilic clays or lignites to the drilling fluid composition.

When used in drilling, "clay-free" invert emulsion drilling fluids have shown reduced downhole losses, reduced pressure surges and spikes, and less barite sag than traditional drilling fluids containing organophilic clay and lignites. Hole drilling is faster with "clay-free" invert emulsion drilling fluids and reservoir productivity is often greater.

A limiting factor in drilling a particular portion of a well is the mud weight (density of the drilling fluid) that can be used. If too high a mud weight is used, fractures are created in the formation with resulting loss of drilling fluid and other operating problems. If too low a mud weight is used, formation fluids can encroach into the well, borehole collapse may occur due to insufficient hydrostatic support, and in extreme cases safety can be compromised due to the possibility of a well blowout. Many times, wells are drilled through weak or lost-circulation-prone zones prior to reaching a potential producing zone, requiring use of a low mud weight drilling fluid and installation of sequential casing strings to protect weaker zones above the potential producing zone. A particularly critical drilling scenario is one that combines deepwater and shallow overburden, as is typical of ultra deepwater fields in Brazil. This scenario is characterized by high pore fluid pressure, low effective stresses, low fracturing gradients and narrow mud weight windows.

Commercially available clay-free invert emulsion drilling fluids may have less than preferred rheology at low mud weights, that is, mud weights ranging from about 9 ppg to about 12 ppg, with temperatures up to about 375° F. or higher. Addition of inert solids may improve the rheology, but result in a decreased rate of penetration during drilling and loss of or decline in other benefits seen with a clay free system. Such inert solids include for example, fine sized calcium carbonate, and the term as used herein is not meant to be understood to include or refer to drill cuttings. Low mud weight or reduced density clay-free oil based invert emulsion drilling fluids also may show a decline in the desired "fragile gel" strength characteristic of clay-free invert emulsion drilling fluids. "Fragile gel" strength generally refers to the ability of the drilling fluid to both suspend drill cuttings at rest and show a lack of a pressure spike upon resumption of drilling. Solids added to an invert emulsion drilling fluid may be difficult to remove later in the drilling process and can ultimately lead to poor control over the rheology of the drilling fluid system and decreased rate of penetration (ROP).

Mineral oils are often used in formulating invert emulsion fluids, and such oils include n-paraffins, mixtures of n-paraffins, iso-paraffins, and cyclic and branched chain alkanes. These base oils offer environmental compatibility and low mud weights. However, they also have low viscosities and invert emulsion fluids prepared with them typically need additives to impart adequate rheology.

Invert emulsion-based muds or drilling fluids (also called invert drilling muds or invert muds or fluids) comprise a key segment of the drilling fluids industry, but they are increasingly being subjected to greater environmental restrictions and performance and cost demands. The complexities and unpredictability of the interaction and behavior of the fluid components with each other and with the conditions encountered during drilling makes meeting these demands challenging. There is a continuing need and thus ongoing industry-wide interest in new drilling fluids that provide improved performance while still affording environmental and economical acceptance.

SUMMARY OF THE INVENTION

The present invention provides a method for enhancing the rheological properties of drilling fluids, particularly at high temperatures, and a method for drilling wellbores employing such improved drilling fluids. The invention is effective with low mud weight "clay-free" invert emulsion drilling fluids, as well as with average and high mud weight "clay-free" invert emulsion drilling fluids, and also with drilling fluids employing clay. A drilling fluid is "clay-free," as the term is used herein, when the drilling fluid composition is made without addition of any organophilic clays or lignites, so that during drilling, the drilling fluid is not dependent on organophilic clays (also called "organo-clays") to obtain suspension of drill cuttings or other solids at rest, and lacks a significant (if any) pressure spike upon resumption of drilling. As used herein, the term "drilling" or "drilling wellbores" shall be understood in the broader sense of drilling operations, which includes running casing and cementing as well as drilling, unless specifically indicated otherwise.

In the method of the invention, a silicon oil is added to the drilling fluid to improve the rheology of the drilling fluid without the addition of inert solids, across a broad range of temperatures and pressures. The invention is effective, and thus particularly advantageous, even at high temperatures and pressures, such as temperatures ranging from about 100° F. to about 375° F. or higher and pressures ranging from about 14 psi to about 30,000 psi or higher.

Adding silicon oil to "clay-free" invert emulsion drilling fluids according to the invention improves rheology of the drilling fluids, even when the fluids have a low mud weight. Clay and/or inert solids need not be added and preferably are not added to provide weight or rheology control to the fluids. Thus, the present invention meets the need of enhancing the rheology of low mud weight, "clay-free" invert emulsion drilling fluids and improves methods of drilling wellbores in subterranean formations employing such invert emulsion drilling fluids.

The invert emulsion drilling fluid used in methods of the present invention comprises an oil:water ratio preferably in the range of 50:50 to 95:5 and preferably employs a natural oil, such as for example without limitation diesel oil or mineral oil, or a synthetic base, as the oil phase, and water comprising a salt such as calcium chloride for example as the aqueous phase. The silicon oil rheology additive of the invention is included for rheology stability and does not interfere with the "fragile gel" behavior of the drilling fluid when the drilling fluid is "clay-free." While some organophilic clay may enter the fluid in the field, for example, due to mixing of recycled fluids with the fluid of the invention, the fluid with the silicon oil is tolerant of such clay in insubstantial quantities, that is, in quantities less than about three pounds per barrel. The fluid, however, behaves more like a traditional drilling fluid when more than about three pounds per barrel of organo-clays are present. Similarly, the fluid is tolerant of low gravity weight solids that may enter the fluid in insubstantial quantities.

Addition of the silicon oil rheology additive to the invert emulsion drilling fluid according to the invention increases the Low Shear Yield Point (LSYP), Yield Point (YP), and the 10 minute Gel Strength but limits the increase in the Plastic Viscosity (PV) to about 50% or less, relative to the drilling fluid not having the additive, when measured at 120° F. At High Pressure High Temperature (HPHT) conditions, the invert emulsion drilling fluid to which the silicon oil rheology additive is added according to the invention shows increased LSYP, YP, and 10 minute Gel Strength, relative to the drilling fluid without the rheology additive of the invention. The PV tends to go towards similar numbers in the fluids with and without silicon oils at HTHP conditions.

DETAILED DESCRIPTION OF PREFERRED EMBODIMENTS

Figure 1:
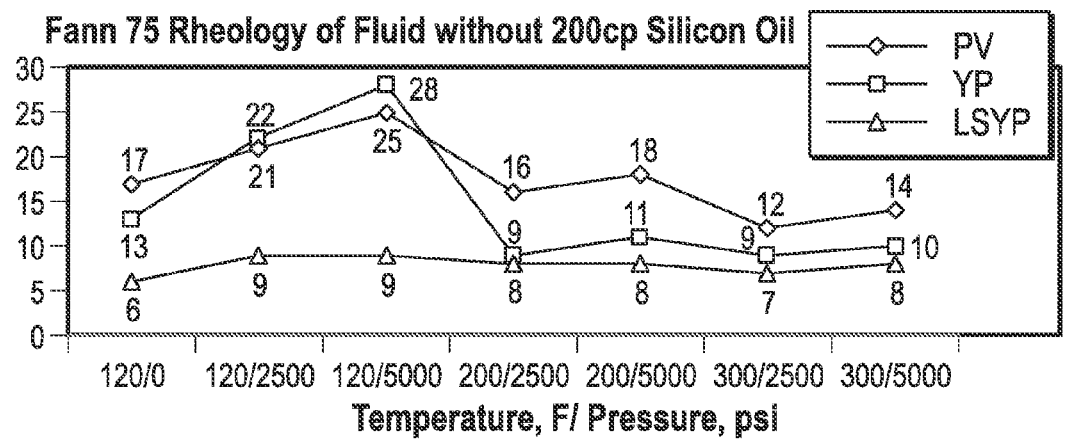
FIG. 1 is a graph showing rheology of a "clay-free" invert emulsion drilling fluid to which silicon oil rheology additive has not been added (Fluid 1 in Table 2).

The present invention provides a method for enhancing the rheology of drilling fluids and particularly oil-based drilling fluids. The advantages of the invention are particularly appreciated with "clay-free," invert emulsion drilling fluids in the field, at mud weights in the range of about 9 ppg to about 15 ppg, and even as high as about 20 ppg. The present invention also provides a method of drilling employing such an invert emulsion drilling fluid comprising the rheology additive added to the drilling fluid according to the invention.

The oil base of invert emulsion drilling fluids used in the present invention may be a natural oil such as for example mineral oil or diesel oil, or a synthetic base such as, for example, BAROID ALKANE® base available from Halliburton Energy Services, Inc., in Houston, Tex. and Duncan, Okla., and EDC 99DW base available from TOTAL. Notably, a mineral oil may be successfully used as the oil base in the present invention, even though in the prior art some difficulties have been experienced in obtaining desirable rheological properties with mineral oils under certain conditions such as low mud weights, that is, mud weights ranging from about 9 to about 12 ppg, and particularly at high temperatures (greater than 225° F.). Mineral oils particularly suitable for use in the invention are selected from the group consisting of n-paraffins, iso-paraffins, cyclic alkanes, branched alkanes, and mixtures thereof.

An aqueous solution containing a water activity lowering compound, composition or material, comprises the internal phase of the invert emulsion. Such solution is preferably a saline solution comprising calcium chloride (typically about 25% to about 30%, depending on the subterranean formation water salinity or activity), although other salts or water activity lowering materials such as for example glycerol or sugar known in the art may alternatively or additionally be used. Such other salts may include for nonlimiting example sodium chloride, sodium bromide, calcium bromide and formate salts. Water preferably comprises less than 50%, or as much as about 50%, of the drilling fluid and the oil:water ratio preferably ranges from about 50:50 to about 95:5.

Drilling fluids used in the present invention uniquely include the silicon oil additive of the present invention as a rheology modifier, as will be discussed further below. Further, the drilling fluids used in the present invention have added to them or mixed with their invert emulsion oil base, other fluids or materials needed to comprise complete drilling fluids. When the drilling fluids are intended to be "clay-free," such other fluids or materials should not destroy the fluids' "clay-free" character and composition. Such other materials optionally may include, for example: additives for enhancing viscosity, for example, an additive having the trade name RHEMOD L™ (modified fatty acid); additives for providing temporary increased viscosity for shipping (transport to the well site) and for use in sweeps, for example, an additive having the trade name TEMPERUS™ (modified fatty acid); additives for filtration control, for example, additives having the trade names ADAPTA® and BDF366™; an emulsifier activator, such as, for example, lime; additives for high temperature high pressure control (HTHP) and emulsion stability, for example, an additive having the trade name FACTANT™ (highly concentrated tall oil derivative); and additives for emulsification, for example, an additive having the trade name EZ MUL® NT (polyaminated fatty acid). All of the aforementioned trademarked products are available from Halliburton Energy Services, Inc. in Houston, Tex., and Duncan, Okla., U.S.A. As with all drilling fluids, the exact formulations of the fluids of the invention vary with the particular requirements of the subterranean formation.

An example preferred commercially available drilling fluid system for use in the invention is the INNOVERT® drilling fluid system, having a paraffin/mineral oil base, available from Baroid, a Halliburton Company, in Houston, Tex. and Duncan, Okla. The INNOVERT® drilling fluid system typically comprises the following additives, in addition to the paraffin/mineral oil base and brine, for use as an invert emulsion drilling fluid: RHEMOD™ L modified fatty acid suspension and viscosifying agent, BDF-366™ or ADAPTA™ copolymer for HPHT filtration control, particularly for use at high temperatures, and EZ MUL® NT polyaminated fatty acid emulsifier/oil wetting agent, also particularly for use at high temperatures. Commercially available INNOVERT® drilling fluid systems also typically include TAU-MOD™ amorphous/fibrous material as a viscosifier and suspension agent. However, with the present invention, where the drilling fluid system has uniquely added thereto a silicon oil as a rheology modifier, TAU-MOD™ material is optional.

"Clay-free" invert emulsion drilling fluids comprising the silicon oil additive of the invention for use in the present invention maintain acceptable and even preferred rheology measurements at low mud weights and do not experience a decreased rate of penetration or a decline in desired fragile gel strength when in use in drilling even at high temperatures and pressures (HTHP). At HTHP conditions, the "clay-free" invert emulsion drilling fluids used in the present invention, comprising the silicon oil rheology additive added to the fluids according to the invention, have increased LSYP, YP, and 10 minute Gel Strength but similar PV relative to the drilling fluids without the silicon oil rheology additive. These advantages are believed to be due to the addition of the silicon oil rheology additive to the drilling fluids according to the present invention. The advantages of the present invention are especially appreciated when the drilling fluid has a low mud weight because rheology problems are more common in the prior art with low mud weight invert emulsion drilling fluids.

The rheology additive used in the present invention comprises a silicon oil. Silicon oils (polymerized siloxanes with organic side chains) are silicon analogues of carbon-based organic compounds, and can form (relatively) long and complex molecules based on silicon rather than carbon. Chains are formed of alternating silicon-oxygen atoms ( . . . Si—O—Si—O—Si . . . ) or siloxane, rather than carbon atoms ( . . . C—C—C—C . . . ). Other species attach to the tetravalent silicon atoms, not to the divalent oxygen atoms which are fully committed to forming the siloxane chain.

In one embodiment of the present invention, the silicon oil rheology additive has a polydimethylsiloxane chemistry, where two methyl groups attach to each silicon atom to form (H3C)[Si(CH$_3$)$_2$O]$_n$Si(CH$_3$)$_3$, where n is a number of repeating [Si(CH$_3$)$_2$O] units, preferably ranging from 2 to several hundred, sufficient to obtain the desired rheology. The chemical structure for preferred polydimethylsiloxanes for the invention is as follows:

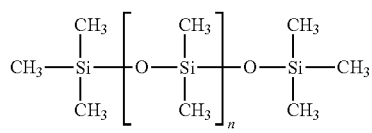

Polydimethylsiloxanes, with a NFPA rating of 0 1 0, are non-toxic and they degrade in soil abiotically to form smaller molecules. These in turn are either biodegraded in soil or volatilized into the air where they are broken down in the presence of sunlight. Under appropriate conditions, the ultimate degradation products are inorganic silica, carbon dioxide and water vapor. Eco-toxicity studies of polydimethylsiloxanes show a LC50 value of greater than 10000 mg/L for rainbow trout and a 96 Hr LC50 of greater than 10000 mg/L for bluegill fish/sunfish.

The amount of silicon oil rheology additive to be added to "clay-free" invert emulsion drilling fluids to control or enhance the rheology of the fluids according to the invention will vary with the composition of the fluids and the field conditions. However, generally, increasing the amount of the silicon oil added to the fluid increases the enhancement of the rheology of the fluid.

Laboratory tests demonstrate the effectiveness of the present invention. Referring to experiments whose results are graphed in FIGS. 1 and 2, a "clay-free" 12 ppg INNOVERT® invert emulsion drilling fluid, available from Halliburton Energy Services, Inc. in Houston, Tex. and Duncan, Okla., was prepared using ESCAID® 110, a paraffin/mineral oil base available from ExxonMobil Chemicals in Houston, Tex., in a 70:30 oil to water ratio with calcium chloride brine having a water phase salinity of 250,000 parts per million (ppm). To this, silicon oils of varying viscosities (10 cP, 200 cP, 500 cP, 1000 cP and 60,000 cP) were added and mixed in for a drilling fluid having the components as indicated in Tables 1 and 2 below, for rheology testing and comparison to the same fluid without any of the silicon oil additives. For such testing, these compositions set forth in Tables 1 and 2 were hot rolled at 250° F. for 16 hours. The fluids were then further mixed for 5 minutes and evaluated on a FANN 35 rheometer at 120° F., testing Plastic Viscosity (PV), Yield Point (YP), and Low Shear Yield Point (LSYP).

The FANN 35 rheometer is a direct-indicating rheometer powered by an electric motor. The rheometer consists of two concentric cylinders, the inner cylinder is called a bob, while the outer cylinder is called a rotor sleeve. For testing using the FANN 35 rheometer, the drilling fluid sample is placed in a thermostatically controlled cup and the temperature of the fluid is adjusted to 120 (±2)° F. The drilling fluid in the thermostatically controlled cup is then placed in the annular space between the two concentric cylinders of the FANN 35 rheometer. The outer cylinder or rotor sleeve is driven at a constant rotational velocity. The rotation of the rotor sleeve in the fluid produces a torque on the inner cylinder or bob. A torsion spring restrains the movement of the bob, and a dial attached to the bob indicates displacement of the bob. The dial readings are measured at different rotor sleeve speeds of 3, 6, 100, 200, 300 and 600 revolutions per minute (rpm).

Generally, Yield Point (YP) is defined as the value obtained from the Bingham-Plastic rheological model when extrapolated to a shear rate of zero. It may be calculated using 300 rpm and 600 rpm shear rate readings as noted above on a standard oilfield rheometer, such as a FANN 35 or a FANN 75 rheometer. Plastic Viscosity (PV) is obtained from the Bingham-Plastic rheological model and represents the viscosity of a fluid when extrapolated to infinite shear rate. The PV is obtained from the 600 rpm and the 300 rpm readings as given below in Equation 1. A low PV may indicate that a fluid is capable of being used in rapid drilling because, among other things, the fluid has low viscosity upon exiting the drill bit and has an increased flow rate. A high PV may be caused by a viscous base fluid, excess colloidal solids, or both. The PV and YP are calculated by the following set of equations:

$$PV = (600 \text{ rpm reading}) - (300 \text{ rpm reading}) \quad \text{(Equation 1)}$$

$$YP = (300 \text{ rpm reading}) - PV \quad \text{(Equation 2)}$$

More particularly, each of these tests were conducted for testing the present invention in accordance with standard procedures set forth in *Recommended Practice* 13*B-2, Recommended Practice for Field Testing of Oil-based Drilling Fluids*, Fourth Edition, American Petroleum Institute, Mar. 1, 2005, the contents of which are hereby incorporated herein by reference.

All trademarked products in the tables below are available from Halliburton Energy Services, Inc., in Houston, Tex. and Duncan, Okla., except that REV DUST is an artificial drill solid available from Milwhite Inc, in Houston Tex. and ESCAID® 110 is a paraffin/mineral oil base available from ExxonMobil Chemicals in Houston, Tex.

TABLE 1

Effect of 500 cP Silicon Oil on Rheology of 12 ppg IEFs (OWR 70:30, WPS 250 Kppm)

| | Time, min | 1 (Base) | 2 |
|---|---|---|---|
| OWR 70:30 | | | |
| ESCAID ® 110, ppb | | 144.4 | |
| 90% w/w ESCAID ® | | | 144.4 |
| 110 + 10% w/w 500 cp silicone oil, ppb | | | |
| EZ MUL NT ®, ppb | 5 | 11 | 11 |
| Lime, ppb | 5 | 1.3 | 1.3 |
| RHEMOD L ®, ppb | | 2 | 2 |
| ADAPTA ®, ppb | 5 | 2 | 2 |
| CaCl$_2$ soln, ppb | 5 | 113.7 | 113.8 |
| Revdust, ppb | 5 | 20 | 20 |
| BDF ™ 570, ppb | 5 | 2.5 | 2.5 |
| BAROID ®, ppb | 5 | 207.7 | 207.7 |
| Hot rolled at 250 F., 16 hrs | | | |
| 600 rpm | @120 F. | 77 | 146 |
| 300 rpm | @120 F. | 47 | 105 |
| 200 rpm | @120 F. | 37 | 88 |
| 100 rpm | @120 F. | 24 | 66 |
| 6 rpm | @120 F. | 8 | 32 |
| 3 rpm | @120 F. | 7 | 30 |
| PV | @120 F. | 30 | 43 |
| YP | @120 F. | 17 | 54 |
| LSYP | @120 F. | 6 | 28 |
| 10 sec gel | @120 F. | 8 | 29 |
| 10 min gel | @120 F. | 13 | 36 |

TABLE 2

Effect of 10 cP, 200 cP, 1K cP and 60K cP Silicon Oils on 12 ppg INNOVERT ® IEF (70/30 OWR; 250K WPS). Hot roll for 16 hrs at 250° F.

| OWR 70:30 | Time, min | 1 (BASE 1) | 2 | 3 | 4 (BASE 2) | 5 | 6 |
|---|---|---|---|---|---|---|---|
| ESCAID ® 110, ppb | | 145.9 | — | — | 149.1 | — | — |
| 90% w/w ESCAID ® 110 + 10% w/w 10 cp silicone oil, ppb | | — | 145.9 | — | — | — | — |
| 90% w/w ESCAID ® 110 + 10% w/w 200 cp silicone oil, ppb | | — | — | 145.9 | — | — | — |
| 90% w/w ESCAID ® 110 + 10% w/w 1K cp silicone oil, ppb | | — | — | — | — | 149.1 | — |
| 90% w/w ESCAID ® 110 + 10% w/w 60K cp silicone oil, ppb | | — | — | — | — | — | 149.1 |
| EZ MUL NT ®, ppb | 2 | 11 | 11 | 11 | 11 | 11 | 11 |
| Lime, ppb | 5 | 1.3 | 1.3 | 1.3 | 1.3 | 1.3 | 1.3 |
| RHEMOD L ®, ppb | 5 | 2 | 2 | 2 | 2 | 2 | 2 |
| ADAPTA ®, ppb | 5 | 2 | 2 | 2 | 2 | 2 | 2 |
| BDF 570 ™, ppb | 5 | 2.5 | 2.5 | 2.5 | — | — | — |
| CaCl$_2$ soln, (250K ppm) ppb | 5 | 114.2 | 114.2 | 114.2 | 115.3 | 115.3 | 115.3 |
| Revdust, ppb | 5 | 5 | 5 | 5 | 5 | 5 | 5 |
| BAROID ®, ppb | 5 | 220.1 | 220.1 | 220.1 | 218.3 | 218.3 | 218.3 |
| Hot rolled at 250° F., 16 hrs | | | | | | | |
| 600 rpm | | 47 | 60 | 94 | 34 | 87 | 150 |
| 300 rpm | | 26 | 40 | 66 | 18 | 57 | 94 |
| 200 rpm | | 20 | 32 | 55 | 12 | 47 | 75 |
| 100 rpm | | 13 | 23 | 41 | 8 | 34 | 52 |
| 6 rpm | | 4 | 8 | 19 | 2 | 14 | 18 |
| 3 rpm | | 3 | 7 | 17 | 2 | 12 | 16 |
| PV | | 21 | 20 | 28 | 16 | 30 | 56 |
| YP | | 5 | 20 | 38 | 2 | 27 | 38 |
| LSYP | | 2 | 6 | 15 | 2 | 10 | 14 |
| 10 sec gel | | 5 | 8 | 17 | 2 | 13 | 16 |
| 10 min gel | | 9 | 13 | 25 | 4 | 16 | 18 |

The laboratory testing reported in Tables 1 and 2 above, using silicon oils of varying viscosities (10 cP, 200 cP, 500 cP, 1000 cP and 60,000 cP) as rheology modifiers, shows that adding the silicon oils to the "clay-free" INNOVERT® invert emulsion drilling fluids according to the invention imparted needed low end rheology to the drilling fluids, which had a low mud weight (12 ppg). Using 500 cP silicon oil at the concentration of 10% by wt of base oil (ESCAID® 110) amount, equivalent to 14 ppb, was sufficient to achieve high low end rheology for the 12 ppg "clay-free" invert emulsion drilling fluid as compared to the base formulation, as shown in Table 1.

Adding silicon oil to the drilling fluids according to the invention also imparted low end rheology even in the absence of low gravity solids like TAU-MOD™ viscosifier, and BARACARB® sized ground marble, both available from Halliburton Energy Services, Inc. in Houston, Tex. and Duncan, Okla. Adding silicon oil according to the invention was also effective when low concentrations of drill solids (5 ppb of Revdust) were used (see Table 2) and also with and without inclusion of BDF570™ viscosifier, available from Halliburton Energy Services, Inc. in Houston, Tex. and Duncan, Okla. In addition, Table 2 shows that the rheology of the 12 ppg "clay-free" invert emulsion drilling fluids increased with the increase in viscosity of the silicon oil. Silicon oils suitable for the invention will generally have a viscosity in the range of about 10 centipoise to about 300K centipoise.

Figure 2:
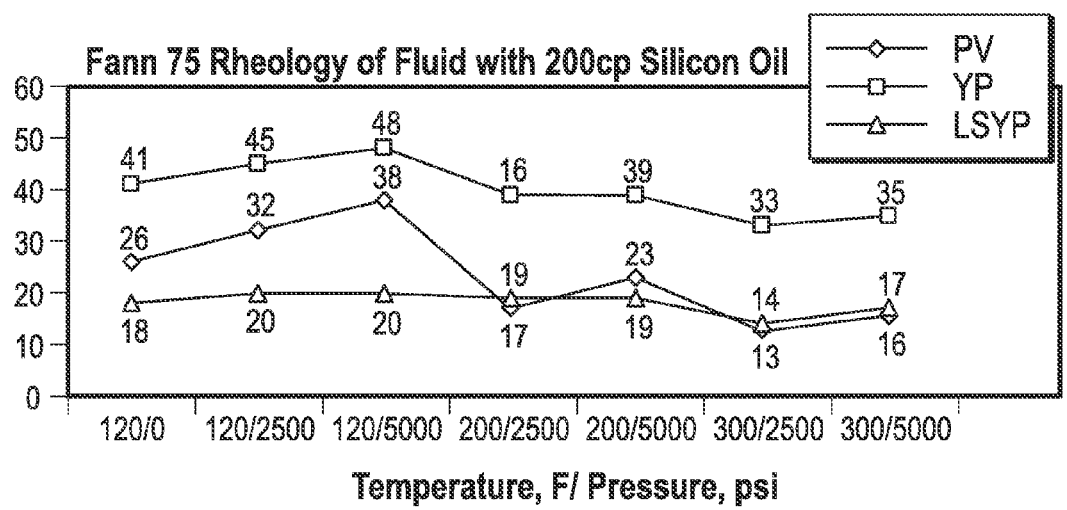
FIG. 2 is a graph showing rheology of a "clay-free" invert emulsion drilling fluid to which silicon oil rheology additive has been added according to the invention (Fluid 3 in Table 2).

Referring to the FIGS. 1 and 2, a comparison can be made of the rheology, shown by the Plastic Viscosity (PV), Yield Point (YP), and Low Shear Yield Point (LSYP), of a "clay-free" invert emulsion drilling fluid without silicon oil (FIG. 1) and with silicon oil added according to the invention (FIG. 2). Specifically, FIG. 1 graphs rheology data from the formulation of Fluid 1 in Table 2 above and FIG. 2 graphs rheology data from the formulation of Fluid 3 from Table 2 above. FIG. 2 indicates that the low mud weight (12 ppg) "clay-free" invert emulsion drilling fluid to which the silicon oil (200 cp) was added according to the invention exhibited an adequate and desirably flat rheology profile under simulated down hole conditions when tested on a Fann 75 for High Temperature and High Pressure rheology. FIG. 2 also shows that this fluid prepared according to the invention also maintained a substantially high YP and LSYP across a broad temperature and pressure range, when compared the base fluid whose rheology data is represented in FIG. 1.

The advantages of the invention may be obtained by employing a "clay-free" invert emulsion drilling fluid to which a silicon oil has been added according to the invention in drilling operations. The drilling operations—whether drilling a vertical or directional or horizontal borehole, conducting a sweep, or running casing and cementing—may be conducted as known to those skilled in the art with other drilling fluids. That is, silicon oil is added as a rheology modifier to the drilling fluid before or while it is circulating through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid is optimized for the particular drilling operation and for the particular subterranean formation characteristics and conditions (such as temperatures). For example, the fluid is weighted as appropriate for the formation pressures and thinned as appropriate for the formation temperatures. As with other "clay free" drilling fluid, the fluids used in the invention afford real-time monitoring and rapid adjustment of the fluid to accommodate changes in such subterranean formation conditions. Thus, more silicon oil may be added to the drilling fluid and/or a higher viscosity silicon oil may be added to further enhance rheology of the drilling fluid as needed. Further, the fluids used in the invention may be recycled during a drilling operation such that fluids circulated in a wellbore may be recirculated in the wellbore after returning to the surface for removal of drill cuttings for example. The drilling fluids may even be selected for use in a drilling operation to reduce loss of drilling mud during the drilling operation and/or to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:

1. A method for drilling in a subterranean formation comprising providing or using in the drilling a clay free invert emulsion drilling fluid having an oleaginous continuous phase, a non-oleaginous discontinuous phase, and a rheology additive comprising a silicon oil, wherein the drilling fluid with the rheology additive, when compared to the drilling fluid without the rheology additive, restricts the increase in plastic viscosity to 50% or less and has at least one of an increased yield point and an increased low shear yield point.

2. The method of claim 1 wherein the silicon oil is polydimethylsiloxane.

3. The method of claim 1 wherein the oleaginous continuous phase comprises: a synthetic oil comprising an ester or olefin; a diesel oil; or a mineral oil selected from the group consisting of n-paraffins, iso-paraffins, cyclic alkanes, branched alkanes, and mixtures thereof.

4. The method of claim 1 wherein the drilling fluid has mud weight in the range of about 9 to about 20 ppg.

5. The method of claim 4 wherein the drilling fluid has mud weight in the range of about 9 to about 12 ppg.

6. The method of claim 1 wherein the drilling fluid comprises from about 0.1 ppb to about 40 ppb of the rheology additive.

7. The method of claim 1 wherein the rheology additive comprises from about 5 ppb to about 30 ppb of silicon oil.

8. The method of claim 1 wherein the silicon oil has a viscosity of about 10 centipoise to about 300K centipoise.

9. The method of claim 1 wherein the drilling fluid has an oil:water ratio in the range of about 50:50 to about 95:5.

10. The method of claim 1 wherein the non-oleaginous discontinuous phase contains a water activity lowering material selected from the group consisting of: sugar; glycerol, salts selected from the group consisting of calcium chloride, calcium bromide, sodium chloride, sodium bromide, and formate; and combinations thereof.

11. The method of claim 1 wherein the drilling fluid with the rheology additive has at least one of an increased yield point and an increased low shear yield point, when compared to the drilling fluid without the rheology additive.

12. The method of claim 1 wherein the clay-free invert emulsion fluid comprises at least one additive from the group consisting of: weighting agents, inert solids, fluid loss control agents, emulsifiers, salts, dispersion aids, corrosion inhibitors, emulsion thinners, emulsion thickeners, viscosifier, high pressure high temperature emulsifier-filtration control agents, and any combination thereof.

13. The method of claim 1 further comprising at least one of drilling a wellbore, running casing in a wellbore: and cementing a wellbore in the subterranean formation.

14. A method for drilling in a subterranean formation comprising providing or using in the drilling a clay-free invert emulsion drilling fluid having a mud weight in the range of about 9 ppg to about 12 ppg, wherein the drilling fluid comprises a continuous oleaginous phase and a discontinuous non-oleaginous phase in an oil: water ratio in the range of about 50:50 to about 95:5, and 5 ppb to 30 ppb rheology additive comprising a silicon oil, wherein the drilling fluid with the rheology additive, when compared to the drilling fluid without the rheology additive, restricts the increase in plastic viscosity to 50% or less and has a characteristic selected from the group consisting of: an increased yield point; an increased low shear yield point; an increased gel strength; and any combination thereof.

15. The method of claim 14 wherein the drilling fluid has an oleaginous phase selected from the group of oils consisting of: diesel oils; ester oils; olefins; and mineral oils selected from the group consisting of n-paraffins, iso-paraffins, cyclic alkanes, branched alkanes, and mixtures thereof.

16. The method of claim 14 wherein the silicon oil is a polydimethylsiloxane having the formula: $(H_3C)_3SiO[Si(CH_3)_2O]_nSi(CH_3)_3$ wherein n has a value of 2 to several hundred.

17. The method of claim 16 wherein the polydimethylsiloxane has the following chemical structure:

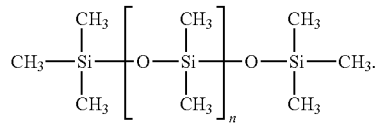

18. A method for drilling in a subterranean formation comprising providing or using in the drilling a clay-free invert emulsion drilling fluid having an oleaginous continuous phase, a non-oleaginous discontinuous phase, and a rheology additive comprising a silicon oil, wherein the drilling fluid comprises from about 0.1 ppb to about 40 ppb of the rheology additive, and wherein the drilling fluid has an oleaginous continuous phase to non-oleaginous discontinuous phase ratio in the range of about 50:50 to about 95:5; wherein the drilling fluid with the theology additive, when compared to the drilling fluid without the rheology additive, restricts the increase in plastic viscosity to 50% or less and has at least one of an increased yield point and an increased low shear yield point.

* * * * *